United States Patent
Mace et al.

(10) Patent No.: US 11,836,355 B2
(45) Date of Patent: Dec. 5, 2023

(54) SYSTEMS AND METHODS FOR RESETTING A DEGRADED STORAGE RESOURCE

(71) Applicant: Dell Products L.P., Round Rock, TX (US)

(72) Inventors: Donald Mace, Mashpee, MA (US); Xiaoye Jiang, Wayland, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/524,995

(22) Filed: Nov. 21, 2021

(65) Prior Publication Data

US 2023/0152979 A1    May 18, 2023

(51) Int. Cl.
*G06F 3/06* (2006.01)
*G06F 11/10* (2006.01)

(52) U.S. Cl.
CPC ............ *G06F 3/0619* (2013.01); *G06F 3/067* (2013.01); *G06F 3/0631* (2013.01); *G06F 3/0659* (2013.01); *G06F 11/1084* (2013.01)

(58) Field of Classification Search
CPC .... G06F 3/0619; G06F 3/0631; G06F 3/0659; G06F 3/067; G06F 11/1084; G06F 11/1441; G06F 11/1438
USPC ........................................................ 711/154
See application file for complete search history.

(56) References Cited

U.S. PATENT DOCUMENTS

| | | | |
|---|---|---|---|
| 9,430,342 B1* | 8/2016 | Byan | G06F 11/14 |
| 9,940,200 B2* | 4/2018 | Andrews | G06F 11/1446 |
| 10,977,139 B1* | 4/2021 | Bueb | G11C 29/52 |
| 2016/0344834 A1* | 11/2016 | Das | H04L 67/1097 |
| 2021/0081105 A1* | 3/2021 | Crowley | G06F 9/4401 |
| 2022/0229781 A1* | 7/2022 | Stumpf | G06F 12/1009 |

OTHER PUBLICATIONS

B. L. Bhuva, S. J. Wen, R. Wong and A. Gaiza, "Single-event effects on SSD controllers," 2017 IEEE International Reliability Physics Symposium (IRPS), Monterey, CA, USA, 2017, pp. SE-4.1-SE-4.5, (Year: 2017).*

* cited by examiner

Primary Examiner — Than Nguyen
(74) Attorney, Agent, or Firm — Jackson Walker L.L.P

(57) ABSTRACT

A method may include, in an operating system of an information handling system: responsive to a determination that a storage resource of the information handling system is experiencing a predictor of a failure of the storage resource, issuing a command to the storage resource to reload firmware code of the storage resource; responsive to the storage resource reloading the firmware code and reset of the storage resource following reloading of the firmware code, determining whether the predictor persists; and responsive to determining whether the predictor persists, performing a responsive action.

15 Claims, 2 Drawing Sheets

SYSTEMS AND METHODS FOR RESETTING A DEGRADED STORAGE RESOURCE

TECHNICAL FIELD

The present disclosure relates in general to information handling systems, and more specifically to resetting a failed storage resource in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may employ one or more storage resources (e.g., solid state drives, other storage resources) for storage of data and information. One disadvantage of storage resources is that they may be prone to failure. However, a storage resource typically does not fail immediately after operating in accordance with its published performance specifications. Instead, a storage resource may experience performance lower than that of its published performance specifications prior to failing completely. Accordingly, declining performance of a storage resource may be a predictor of a future failure of the storage resource. Other predictors may include an increase in input/output errors (e.g., failed reads to or writes from a storage resource), errors reported by the storage resource (if supported by the storage resource), and/or other predictors. A replacement of the storage resource may resolve the declining performance, but the storage resource may also be capable of returning to published performance levels by others means.

For example, one approach to resolving performance issues may be to power cycle a storage resource. Power cycling may lead to recovery in scenarios in which degraded performance is caused by firmware of the storage resource. While power cycling of storage resources is available in some information handling systems, other information handling systems, including some servers, may not support power cycling of storage resources. Thus, other approaches to restart storage resource firmware may be desired.

SUMMARY

In accordance with the teachings of the present disclosure, the disadvantages and problems associated with resetting a failing storage resource may be reduced or eliminated.

In accordance with embodiments of the present disclosure, an information handling system may include a processor, a storage resource communicatively coupled to the processor, and an operating system embodied in non-transitory computer-readable media and configured to, when read and executed by the processor: (i) responsive to a determination that the storage resource is experiencing a predictor of a failure of the storage resource, issue a command to the storage resource to reload firmware code of the storage resource; (ii) responsive to the storage resource reloading the firmware code and reset of the storage resource following reloading of the firmware code, determine whether the predictor persists; and (iii) responsive to determining whether the predictor persists, perform a responsive action.

In accordance with these and other embodiments of the present disclosure, a method may include, in an operating system of an information handling system: responsive to a determination that a storage resource of the information handling system is experiencing a predictor of a failure of the storage resource, issuing a command to the storage resource to reload firmware code of the storage resource; responsive to the storage resource reloading the firmware code and reset of the storage resource following reloading of the firmware code, determining whether the predictor persists; and responsive to determining whether the predictor persists, performing a responsive action.

In accordance with these and other embodiments of the present disclosure, an article of manufacture may include a computer readable medium and computer-executable instructions carried on the computer readable medium, the instructions readable by a processor, the instructions, when read and executed, for causing the processor to, in an operating system of an information handling system: (i) responsive to a determination that a storage resource of the information handling system is experiencing a predictor of a failure of the storage resource, issue a command to the storage resource to reload firmware code of the storage resource; (ii) responsive to the storage resource reloading the firmware code and reset of the storage resource following reloading of the firmware code, determine whether the predictor persists; and (iii) responsive to determining whether the predictor persists, perform a responsive action.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
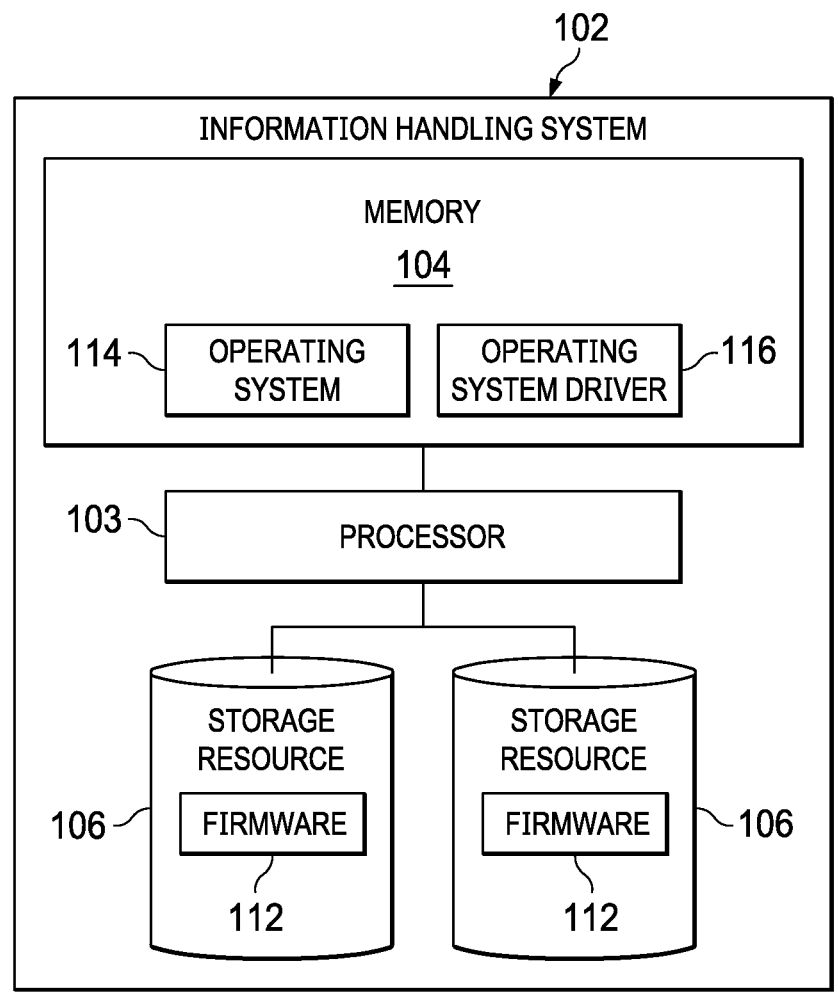
FIG. 1 illustrates a block diagram of an example information handling system, in accordance with certain embodiments of the present disclosure.
Figure 2:
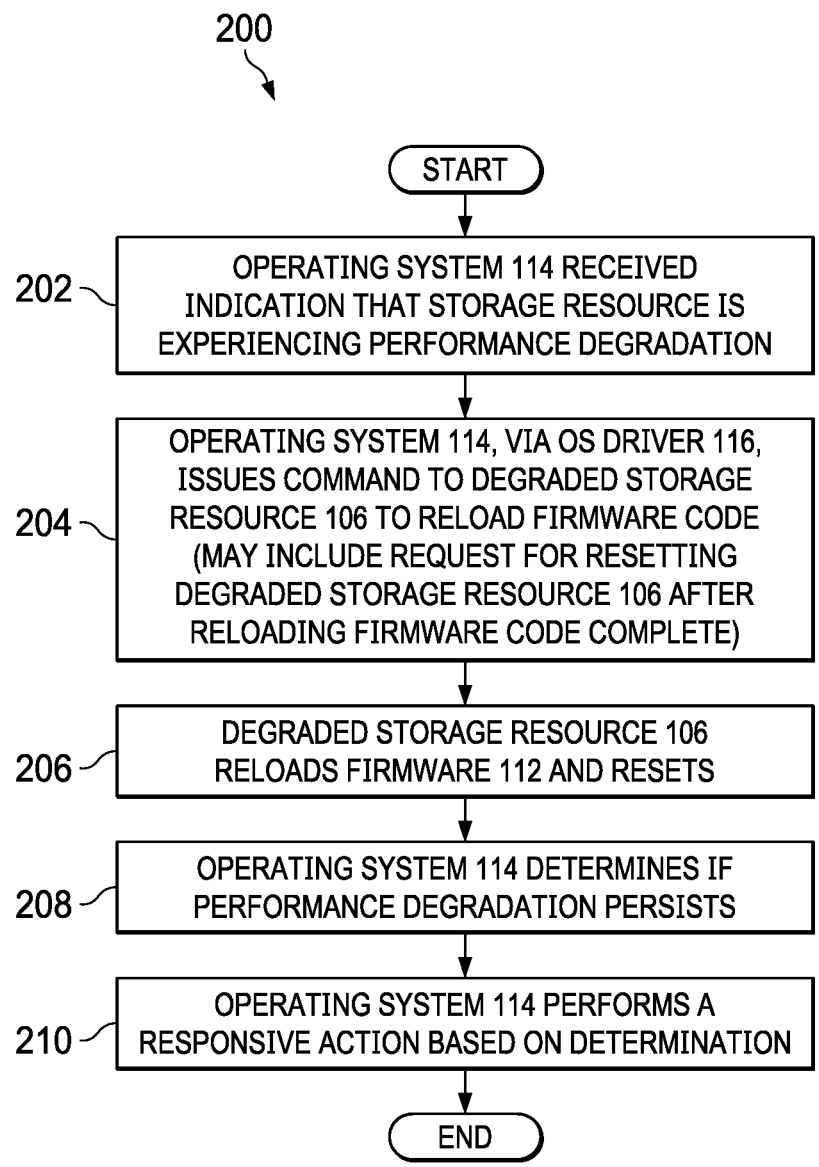
FIG. 2 illustrates a flow chart of an example method for resetting a failing storage resource, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, and one or more storage resources 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resources 106, and/or another component of information handling system 102. Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, storage resources 106 may have stored thereon an operating system 114 and an operating system (OS) driver 116.

Operating system 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 114. Active portions of operating system 114 may be transferred to memory 104 from other computer readable media for execution by processor 103.

OS driver 116 may comprise a program of instructions configured to, when read and executed by processor 103, provide an interface between operating system 114 and storage resources 106 in order to perform an in-band reset of storage resources 106, as described in greater detail below.

Storage resources 106 may be communicatively coupled to processor 103 and may include any system, device, or apparatus operable to store information processed by processor 103. Storage resources 106 may include, for example, network attached storage, one or more direct access storage devices (e.g., hard disk drives), and/or one or more sequential access storage devices (e.g., tape drives). In particular embodiments, one or more storage resources 106 may comprise solid state drives.

As shown in FIG. 1, a storage resource 106 may have firmware 112 stored thereon. Firmware 112 may comprise any program of executable instructions, or aggregation of programs of executable instructions, configured to perform the functionality of storage resource 106, including managing and/or controlling the allocation and usage of resources of storage resource 106.

In operation, OS driver 116 may, responsive to a performance degradation of a storage resource 106 and/or other predictor of a future failure of storage resource 106, issue a passthrough in-band command to storage resource 106 to reload its firmware code for firmware 112 and specify that a reset of storage resource 106 is needed once the reloading of firmware code is complete. In response, the storage resource 106 may reload its existing firmware code and then reset. Many storage resources, including solid state drives, support reloading of existing code already running on the storage resource and also support an option to reset the storage resource when reloading of the firmware code has completed.

In response to the reset of storage resource 106, operating system 114 may determine whether the performance degradation of the storage resource 106 and/or other predictor was resolved by the reset. Resolution of the performance degradation and/or other predictor may indicate that the performance degradation and/or other predictor was firmware related and further indicate that the storage resource 106 need not be replaced. However, if the performance degradation and/or other predictor persists following the reset, such may indicate that performance degradation and/or other predictor is related to hardware of the storage resource 106, further indicating that the storage resource 106 should be replaced.

FIG. 2 illustrates a flow chart of an example method 200 for resetting a failing storage resource, in accordance with embodiments of the present disclosure. According to certain embodiments, method 200 may begin at step 202. As noted above, teachings of the present disclosure may be implemented in a variety of configurations of information handling system 102 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, operating system 114 may receive an indication or otherwise determine that a storage resource 106 is experiencing performance degradation (e.g., such storage resource 106 operating with performance lower than that of published specifications) and/or other predictor of failure. In response, at step 204, operating system 114 may, via OS driver 116, issue a passthrough in-band command to the degraded storage resource 106 to reload its firmware code for firmware 112. In some embodiments, such in-band command may include a request for resetting the degraded storage resource 106 once the reloading of firmware code has completed.

At step 206, in response to the command, the degraded storage resource 106 may reload its firmware 112 and reset.

At step 208, operating system 114 may determine whether or not the performance degradation and/or other predictor has persisted through the reset of the degraded storage resource 106. At step 210, based on such determination, operating system 114 may perform a responsive action. For example, if the performance degradation and/or other predictor has persisted through the reset of the degraded storage resource 106, indicating potential imminent hardware failure of the degraded storage resource 106, operating system 114 may generate an alert (e.g., visual and/or audio) to indicate to a person (e.g., an end user or administrator of information handling system 102) that the degraded storage resource 106 is experiencing potential imminent hardware failure. As another example, if the performance degradation and/or other predictor has been eliminated as a result of the reset, indicating a firmware-based degradation and/or other predictor had occurred, operating system 114 may determine that storage resource 106 is operating correctly.

After completion of step 210, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other system such as those shown in FIG. 1 operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a storage resource communicatively coupled and locally connected to the processor; and
an operating system embodied in non-transitory computer-readable media and configured to, when read and executed by the processor:
responsive to a determination that the storage resource is experiencing a predictor of a failure of the storage resource, invoke an operating system driver to perform an in-band reset of the storage resource to reload firmware code of the storage resource;
after reloading the firmware code and resetting the storage resource following the in-band reset, determine whether the predictor persists; and
responsive to determining whether the predictor persists, perform a responsive action.

2. The information handling system of claim 1, wherein the command includes an option to reset the storage resource once reloading of the firmware code is complete.

3. The information handling system of claim 1, wherein responsive to determining that the predictor persists, the responsive action is a communication of an alert indicating that the predictor persists.

4. The information handling system of claim 1, wherein responsive to determining that the predictor is non-persistent, the responsive action is a determination that the storage resource is in normal operation.

5. The information handling system of claim 1, wherein the predictor is a determination that a storage resource of the information handling system is experiencing performance degradation.

6. A method comprising, in an operating system of an information handling system:
responsive to a determination that a locally connected storage resource of the information handling system is experiencing a predictor of a failure of the storage resource, invoking an operating system driver to perform an in-band reset of the storage resource to reload firmware code of the storage resource;
after reloading the firmware code and resetting the storage resource following the in-band reset, determining whether the predictor persists; and
responsive to determining whether the predictor persists, performing a responsive action.

7. The method of claim 6, wherein the command includes an option to reset the storage resource once reloading of the firmware code is complete.

8. The method of claim 6, wherein responsive to determining that the predictor persists, the responsive action is a communication of an alert indicating that the predictor persists.

9. The method of claim 6, wherein responsive to determining that the predictor is non-persistent, the responsive action is a determination that the storage resource is in normal operation.

10. The method of claim 6, wherein the predictor is a determination that a storage resource of the information handling system is experiencing performance degradation.

11. An article of manufacture comprising:
a computer readable medium; and
computer-executable instructions carried on the computer readable medium, the instructions readable by a processor, the instructions, when read and executed, for causing the processor to, in an operating system of an information handling system:
responsive to a determination that the storage resource is experiencing a predictor of a failure of the storage resource, invoke an operating system driver to perform an in-band reset of the storage resource to reload firmware code of the storage resource;
after reloading the firmware code and resetting the storage resource following the in-band reset, determine whether the predictor persists; and
responsive to determining whether the predictor persists, perform a responsive action.

12. The article of claim 11, wherein the command includes an option to reset the storage resource once reloading of the firmware code is complete.

13. The article of claim 11, wherein responsive to determining that the predictor persists, the responsive action is a communication of an alert indicating that the predictor persists.

14. The article of claim 11, wherein responsive to determining that the predictor is non-persistent, the responsive action is a determination that the storage resource is in normal operation.

15. The article of claim 11, wherein the predictor is a determination that a storage resource of the information handling system is experiencing performance degradation.

* * * * *